United States Patent [19]

Glass

[11] Patent Number: 4,628,871
[45] Date of Patent: Dec. 16, 1986

[54] FUEL SUPPLY SYSTEM FOR AN INTERNAL COMBUSTION ENGINE

[75] Inventor: James W. Glass, New Castle, Pa.

[73] Assignee: V. G. C. Corporation, Pittsburgh, Pa.

[21] Appl. No.: 796,649

[22] Filed: Nov. 8, 1985

[51] Int. Cl.$^4$ .................................... F02M 25/02
[52] U.S. Cl. ........................ 123/25 B; 123/25 J; 123/25 P; 123/557
[58] Field of Search ............... 123/25 B, 25 C, 25 D, 123/25 P, 25 J, 25 L, 557

[56] References Cited

U.S. PATENT DOCUMENTS

| | | | |
|---|---|---|---|
| 1,888,682 | 11/1932 | Mazarek | 123/25 B |
| 2,686,502 | 8/1954 | Tesch | 123/25 B |
| 2,687,120 | 8/1954 | Malec | 123/25 L |
| 3,968,775 | 7/1976 | Harpman | 123/25 B |
| 3,980,055 | 9/1976 | Webb | 123/25 B |
| 4,030,453 | 6/1977 | Sugimoto | 123/25 B |
| 4,112,889 | 9/1978 | Harpman | 123/25 B |
| 4,329,945 | 5/1982 | Beech et al. | 123/25 P |
| 4,333,422 | 6/1982 | Mahoney | 123/25 B |
| 4,368,711 | 1/1983 | Allen | 123/25 B |
| 4,423,716 | 1/1984 | Glass | 123/557 |
| 4,452,215 | 6/1984 | Glass | 123/557 |
| 4,509,464 | 4/1985 | Hansen | 123/25 B |
| 4,515,135 | 5/1985 | Glass | 123/557 |

*Primary Examiner*—Ira S. Lazarus
*Attorney, Agent, or Firm*—Webb, Burden, Robinson & Webb

[57] ABSTRACT

A fuel supply system for an internal combustion engine having an intake manifold, an exhaust manifold, a carburetor and an air cleaner mounted on the carburetor. The system includes a heat exchanger in the exhaust manifold and a converter within the heat exchanger. An adapter plate is mounted on the intake manifold and the carburetor is mounted on the adapter plate. The adapter plate has passages providing communication between the carburetor and the intake manifold and with a metering valve mounted on the adapter plate. A main liquid fuel inlet line having a pressure regulator, a solenoid valve, a vacuum responsive pressure regulator and a vacuum controlled needle valve is connected to a fuel pump. The fuel inlet line is split into a primary fuel line and a secondary fuel line which are connected to the converter. A solenoid valve and a check valve are located in the secondary line and a check valve is located in the primary line. A water supply line having a pressure regulator, a solenoid valve, a fixed orifice restrictor and a check valve is connected to the converter. A vacuum controlled switch is connected to the intake manifold and is electrically connected to the solenoid valves in the secondary fuel line and the water supply line to open the solenoid valves when the vacuum in the intake manifold increases as the engine accelerates. A fuel vapor line connects the converter and the metering valve to supply fuel vapor and steam to the metering valve to mix with air flowing through the carburetor to provide a hot fuel vapor, steam and air mixture to the intake manifold. The vacuum controlled switch is connected to the vacuum responsive pressure regulator and the vacuum controlled needle valve to provide increased fuel flow through the main fuel inlet line as the engine accelerates and the vacuum in the intake manifold increases.

10 Claims, 4 Drawing Figures

FUEL SUPPLY SYSTEM FOR AN INTERNAL COMBUSTION ENGINE

BACKGROUND OF THE INVENTION

1. Field of the Invention

The invention relates generally to a fuel supply system for use with an internal combustion engine and more particularly to a fuel supply system wherein a heated mixture of air, gasoline vapor and, under certain conditions, steam are provided to the intake manifold of the engine to increase the efficiency of the engine and to decrease the pollutants exhausted from the engine.

2. Description of the Prior Art

A fuel supply system for an internal combustion engine generally includes at least one carburetor wherein liquid gasoline is sprayed into a stream of incoming air which divides the liquid gasoline into fine droplets and conveys the gasoline droplets to the intake manifold of the engine. In such an arrangement, only the surface of the gasoline droplets can react with the oxygen in the air to burn which results in incomplete combustion and therefore does not fully utilize the fuel. Additionally, the exhaust gases discharged from the engine contain substantial amounts of unburned hydrocarbons, carbon monoxide and oxides of nitrogen which are undesirable air pollutants.

Improved fuel supply systems include fuel injection arrangements wherein liquid fuel is injected directly into the intake manifold of an engine. Such systems provide greater vaporization than systems using one or more carburetors, but the fuel is still not completely and efficiently burned.

Other fuel supply systems introduce water into liquid fuel and attempts have been made to simultaneously vaporize the liquid fuel and the water. Such systems are relatively ineffective because of the separation of the liquid fuel vapor and the steam into droplets which results in incomplete combustion of the fuel mixture and occasional stalling of the engine. Additionally, this type of system requires that the engine operate at substantially uniform rpm or at a steady number of miles per hour.

Systems for producing a gaseous fuel for use in an internal combustion engine are disclosed in U.S. Pats. Nos. 4,452,215 and 4,423,716 which are directed to inventions made by the inventor of the instant application. The invention of the instant application is an improvement over the systems disclosed in those patents.

SUMMARY OF THE INVENTION

A fuel supply system for an internal combustion engine wherein liquid gasoline is supplied to a converter in a heat exchanger to produce heated fuel vapor under pressure which is supplied to the intake manifold of the engine. The system includes a control valve and a pressure regulator in the main liquid fuel line which are repsonsive to the intake manifold vacuum. Water may also be supplied to the converter in the heat exchanger under certain conditions to be vaporized and supplied to the intake manifold of the engine along with the heated gasoline vapor. The heat exchanger is an integral part of the engine exhaust manifold so that the exhaust gas heat is utilized to heat and vaporize the liquid gasoline and the water. The fuel vapor and steam enter the engine intake manifold through a valve and an adapter plate having spray rings. A conventional carburetor and air cleaner are mounted on the adapter plate to supply combustion air to the intake manifold.

DESCRIPTION OF THE PREFERRED EMBODIMENT

Figure 1:
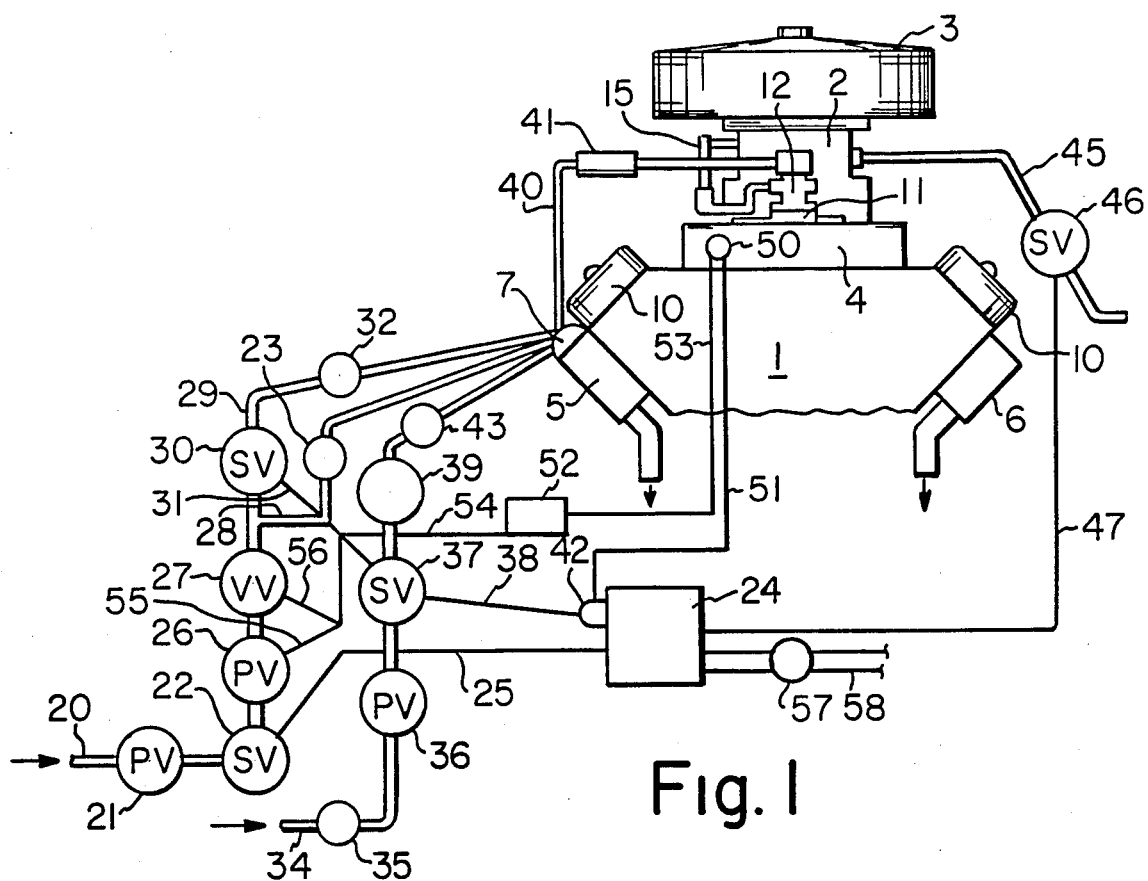
FIG. 1 is a diagrammatic illustration of an internal combustion engine, and the fuel supply system of the invention.

FIG. 1 of the drawings shows the fuel supply system in conjunction with a standard internal combustion engine 1 having a standard carburetor 2 mounted thereon and a standard air cleaner 3 mounted on the carburetor. The internal combustion engine includes an intake manifold 4, exhaust manifolds 5 and 6 and valve covers 10. An adapter plate 11 and a mechanical metering valve 12, shown in detail in FIGS. 2 and 3 of the drawings, are mounted on intake manifold 4 and are in communication therewith. The carburetor 2 is mounted on the top of adapter plate 11 and is in communication with the intake manifold through openings 9 in the adapter plate.

Figure 2:
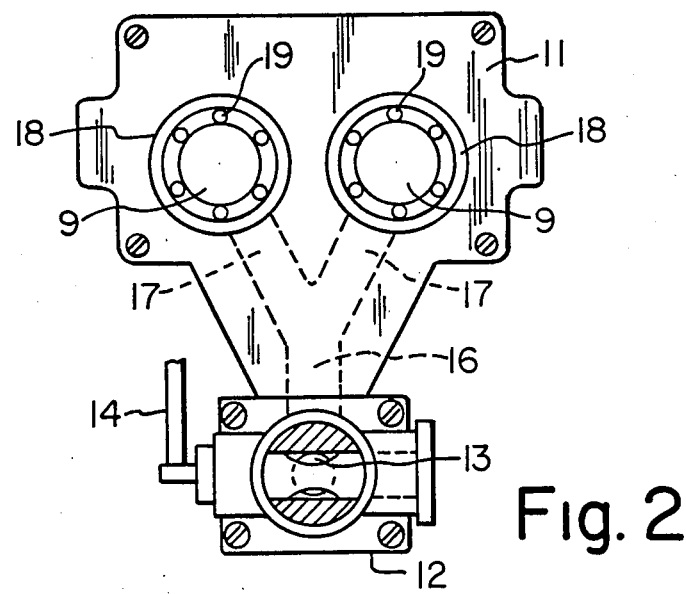
FIG. 2 is a plan view of the adapter plate and valve mounted on the engine in the fuel system.
Figure 3:
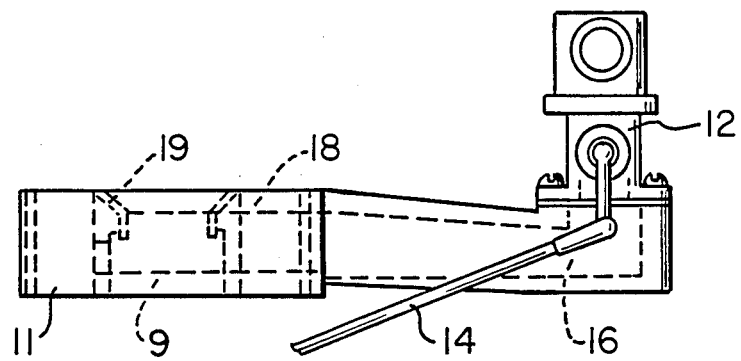
FIG. 3 is a side elevation of the adapter plate and valve shown in FIG. 2.

The carburetor 2 contains a butterfly valve (not shown) for controlling the flow of combustion air to intake manifold 4 and has an accelerator control link 15 for operating the butterfly valve. The mechanical metering valve 12 is also mounted on adapter plate 11 and is illustrated in FIGS. 2 and 3 of the drawings. The metering valve 12 controls the flow through an inlet port 13 into a passage 16 in the adapter plate. An accelerator link 14 is attached to metering valve 12 for controlling flow through the valve to inlet port 13. The links 14 and 15 normally urge the butterfly valve in carburetor 2 and mechanical metering valve 12 into an almost closed position wherein air and fuel flowing to the engine intake manifold are sufficient only for idling. The operation of the accelerator moves links 14 and 15 to simultaneously control both the butterfly valve in carburetor 2 and the mechanical metering valve 12 on adapter plate 11.

With specific reference to FIG. 1 of the drawings, the fuel supply system comprises a main liquid fuel inlet line 20 having its inlet end connected to a standard fuel pump (not shown). The inlet end of fuel line 20 has a preset pressure regulator 21 located therein. The pressure regulator is manufactured by C. R. Industries in Elgin, Ill. Downstream of pressure regulator 21, the fuel line is connected to a solenoid valve 22 which is electrically connected to a standard delay relay 24 by conductors 25. The fuel line also includes a vacuum responsive adjustable pressure regulator 26 downstream of solenoid valve 22 and a vacuum controlled needle valve 27 downstream of pressure regulator 26. The needle valve 27 is shown in detail in FIG. 4 of the drawings. At the downstream side of needle valve 27, fuel line 20 is split into a primary fuel line 28 flowing through a check valve 23 to a converter (not shown) in a heat exchanger 7 in exhaust manifold 5 and a secondary fuel line 29 flowing into the converter in heat exchanger 7 in exhaust manifold 5 through a solenoid valve 30 and a check valve 32. The converter and heat exchanger 7 are constructed in accordance with U.S. Pat. No. 4,515,135 except that they are located within the exhaust manifold 5 rather than being piped to the exhaust manifold as in the aforementioned patent.

A water supply line 34 is connected at its inlet end to a reservoir (not shown) containing water with alcohol mixed therein to prevent freezing. A standard water pump 35 pumps water from the reservoir through water supply line 34. The flow of water through line 34 is controlled by a preset pressure regulator 36 and a solenoid valve 37 which is electrically connected to delay relay 24 by conductors 38. Solenoid valve 37 is also electrically connected to solenoid valve 30 by conductors 31. A switching terminal 42 for controlling the operation of solenoid valves 30 and 37 is located adjacent to delay relay 24. A fixed orifice restrictor 39 is included in water line 34 downstream of solenoid valve 37, and a check valve 43 is located between the converter in heat exchanger 7 in exhaust manifold 5 so that water flows through the restrictor and the check valve prior to entering the converter in the heat exchanger. The check valves 23, 32 and 43 prevent reverse flow through the respective fuel and water lines, and the pressure regulator insures that the water pressure is the same as the fuel pressure in line 20.

Vaporized fuel and steam, when used, flow from the converter in heat exchanger 7 through a vapor conduit 40 having insulation 41 therearound into the metering valve 12 from which the vaporized fuel and steam flow through inlet port 13 into the adapter plate 11. Vapor conduit 40 is insulated so that the heat loss from the fuel vapor and steam is minimized between the converter in heat exchanger 7 in exhaust manifold 5 and the inlet port 13 in metering valve 12. The heated fuel vapor and steam mixture flows through passage 16 and passages 17 in adapter plate 11 to a pair of outlet rings 18. Each outlet ring has a plurality of spray nozzles 19 located around its periphery. Fuel vapor and steam are sprayed from the spray nozzles 19 into the air passing through openings 9 from the air cleaner and the carburetor.

The engine has an auxiliary fuel line 45 which initially supplies liquid fuel to carburetor 2 until the engine has run for a short period of time to raise the temperature in heat exchanger 7 in exhaust manifold 5 to a temperature sufficient to vaporize the fuel flowing to the converter through primary fuel line 28. The auxiliary fuel line 45 includes solenoid valve 46 which is electrically connected with delay relay 24 by conductors 47.

A vacuum controlled switch 50 is mounted near the intake manifold with a probe extending into the manifold to sense the vacuum therein. The switch is a snap-action type manufactured by Borg-Warner Corporation. The vacuum control switch 50 is electrically connected by conductors 51 to delay relay 24. The vacuum control switch is also in flow communication with a vacuum block 52 by means of a conduit 53. The vacuum block is a hollow aluminum block having an inlet for conduit 53 and an outlet which is connected to a conduit 54 having a first branch 55 connected to pressure regulator 26 and a second branch 56 connected to vacuum controlled needle valve 27.

Figure 4:
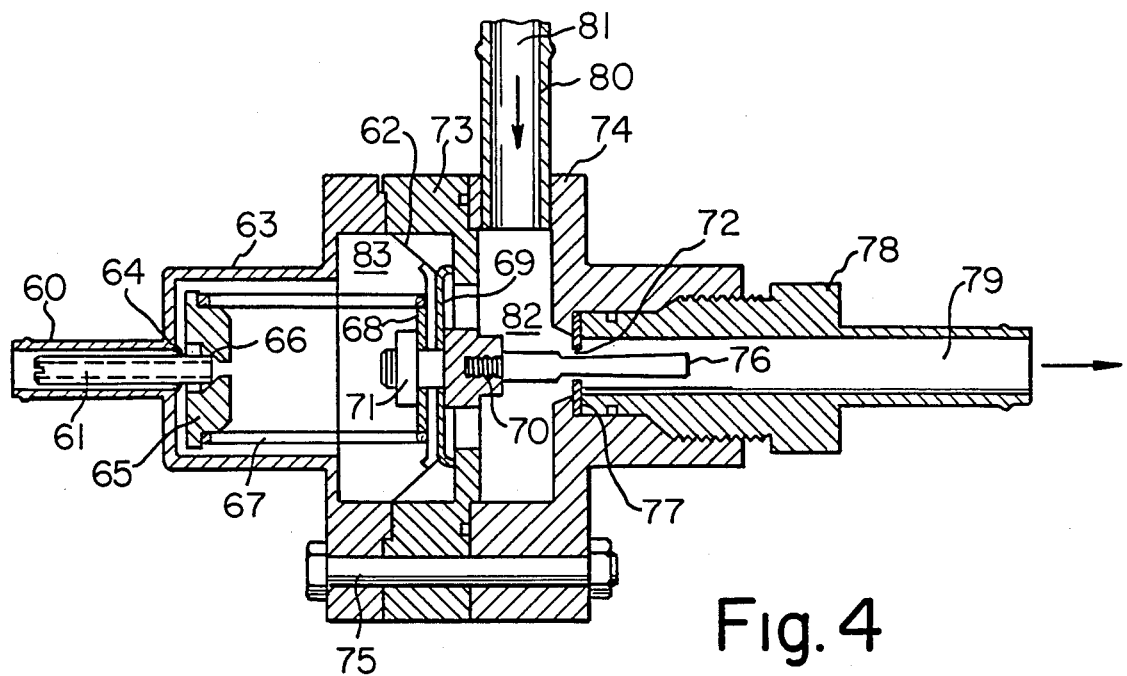
FIG. 4 is a section through the vacuum controlled needle valve used in the main liquid gasoline line of the fuel system.

The vacuum controlled needle valve 27 is shown in detail in FIG. 4 of the drawings. The valve controls the flow of liquid fuel through fuel line 20 to the primary fuel line 28 and the secondary fuel line 29. Valve 27 is connected with the intake manifold of the engine and responds to the vacuum created in the intake manifold which varies as the engine speed varies. Thus, a relatively higher vacuum exists when the engine is operating at high speed, and this permits the controlled needle valve 27 to open to its maximum flow capacity to permit an increased amount of fuel to flow to the converter in heat exchanger 7. As the engine speed decreases, the vacuum in the intake manifold decreases, and control valve 27 gradually closes to decrease the amount of fuel flowing to the converter and subsequently to the intake manifold of the engine. The needle valve 27 is formed by an inlet body section 63, a center body section 73 and an outlet body section 74. The vacuum chamber 83 is formed by body section 63 and center body section 73, and the fuel chamber 82 is formed by outlet body section 74 and center body section 73. The three sections of the valve body are held together by a plurality of bolts 75. An outlet member 78 having a passage 79 formed therein is threadedly connected at one end to body section 74 and is connected at the other end to the fuel line 20. An inlet member 80 having a passage 81 is connected at one end to fuel line 20 and at the other end to body section 74 so that liquid fuel supplied through passage 81 flows into fuel chamber 82 in valve 27 and passes out through orifice 72 in the orifice plate 77 into the passage 79 in outlet member 78 from which it flows to the converter in heat exchanger 7 in exhaust manifold 5.

The valve includes a vacuum tube 60 which is in communication with branch 56 of vacuum line 54. The tube 60 contains a hollow adjustment member 61 which permits the vacuum in the intake manifold to act upon a diaphragm 62 located within the body of needle valve 27 and having its outer edge clamped between body sections 63 and 73. The diaphragm is made from a material which is resistant to both elevated temperatures and hydrocarbons. The adjustment member 61 is threadedly connected to inlet body section 63 by threads 64, and the inner end of member 61 contacts the recessed center portion 66 of a base member 65 located in the vacuum chamber of the valve. Base member 65 supports one end of a coil spring 67, and the opposite end of coil spring 67 contacts the periphery of a washer 68 which is in contact with one side of diaphragm 62. The washer 68 is on the vacuum side of the diaphragm, and a complimentary washer 69 is located on the opposite side of diaphragm 62 in fuel chamber 82 of the valve. A bolt extends through the center of the diaphragm and through washers 68 and 69.

The bolt has an enlarged head 70 located in fuel chamber 82 and a threaded end located in vacuum chamber 83 which receives a nut 71. When nut 71 is tightened on the bolt, the head 70 contacts washer 69 and the nut contacts washer 68 to clamp the washers and the diaphragm together. A tapered metering rod 76 is threadedly connected to a threaded bore in bolt head 70. The metering rod passes through orifice 72 in orifice plate 77 to form an annular passage between the orifice plate and the rod.

In operation the size of the annular passage in orifice 72 in orifice plate 77 is controlled by the position of the tapered metering rod 76 which is controlled by the position of diaphragm 62 in vacuum chamber 83. The vacuum in the intake manifold and the coil spring 67 move the diaphragm and the metering rod to control the amount of liquid fuel which can pass through the annular passage in orifice 72 in orifice plate 77 to the converter in the heat exchanger.

The fuel system of the invention operates as follows. The ignition switch 57 is closed when the key is turned to the on position to activate the automobile electrical system and supply current through conductors 58 to delay relay 24. Delay relay 24 opens solenoid valve 46 in auxiliary fuel line 45 to provide liquid fuel from the fuel pump to the carburetor 2 so that the engine can start. After the engine has run for a short period of time, for example, approximately three minutes, the exhaust manifold will be heated to a sufficient temperature, approximately 1200° F., to vaporize liquid fuel passing to the converter through primary fuel line 28. At this point, a time delay switch in the delay relay closes solenoid valve 46 to eliminate the fuel line 45 from the fuel supply system. Whereas the auxiliary fuel line is used to supply fuel to the engine until the temperature in the exhaust manifold is sufficiently high to vaporize the liquid fuel in the converter, it will be recognized by those skilled in the art that a glow plug or other electric heat source may be utilized to initially vaporize the liquid fuel flowing to the intake manifold and thereby eliminate the auxiliary fuel line.

When delay relay 24 closes solenoid valve 46, solenoid valve 22 in the fuel line 20 is opened to permit liquid fuel to flow through the primary fuel line 28 to the converter in the heat exchanger 7 in exhaust manifold 5 to vaporize the fuel and supply it to the engine intake manifold through vapor conduit 40, metering valve 12 and adapter plate 11. The liquid fuel will vaporize at approximately 1200° F. in the converter located in the heat exchanger and, as stated, this temperature will be reached after approximately three minutes of engine operation. The vacuum controlled needle valve 27 in fuel line 20 operates after the fuel supply system is switched from initial carburetor operation to vapor operation. The vacuum pulled in the valve will vary from 8 to 10 inches of mercury, and the valve will open as the vacuum in the intake manifold increases at higher speeds. The valve closes as the vacuum in the intake manifold decreases as the engine speed slows to idle speed.

The preset pressure regulator 21 in the fuel line 20 is permanently set at 2.5 pounds per square inch maximum pressure to lower the pressure of the fuel which is supplied from the vehicle fuel tank by the fuel pump which is normally on the order of 7 pounds per square inch. The adjustable pressure regulator 26 in fuel line 20 is controlled by the vacuum in the intake manifold and will begin to operate at approximately one pound per square inch, and as the engine speed increases and the vacuum increases, the pressure regulator 26 will open to a maximum of 2.5 pounds per square inch.

The solenoid valve 30 in the secondary fuel line 29 will be opened when the engine speed increases sufficiently for the vacuum in intake manifold 4 to drop below 8-10 inches of mercury to permit additional fuel to flow to the converter in heat exchanger 7 and to intake manifold 4 at higher engine speeds. Additionally, the solenoid valve 37 in the water line 34 will open when the vacuum in the intake manifold drops below approximately 8-10 inches of mercury. This insures that no water will flow into the engine intake manifold since the vacuum will not drop below 8-10 inches of mercury until the engine has accelerated, at which point the converter in heat exchanger 7 is at a sufficiently high temperature to guarantee that all of the water will be vaporized before it is supplied to the intake manifold. Solenoid valves 30 and 37 are operated by a standard switching terimal 42 which is electrically connected to vacuum switch 50.

While a delay relay 24 is shown in FIG. 1 of the drawings for controlling the solenoid valves, it will be understood by those skilled in the art that manual control switches may be utilized to control the fuel supply system in place of the delay relay.

The fuel supply system of the invention is balanced by preset pressure regulator 21 and vacuum responsive pressure regulator 26 so as to supply the amount of fuel necessary to obtain the proper idle when the fuel is in the vapor condition. As the vacuum in the intake manifold increases during acceleration, the vacuum controlled needle valve 27 opens to permit a greater volume of liquid fuel to flow to the converter and pressure regulator 26 opens to permit flow at an increased pressure which results in more fuel vapor flowing to the engine during acceleration. Additionally, switching terminal 42 opens solenoid valves 30 and 37 at higher engine speeds to increase the amount of liquid fuel flowing to the converter and to permit water to flow to the converter.

It will be seen that the invention provides a simple yet very efficient fuel supply system for an internal combustion engine. Liquid fuel is efficiently and rapidly converted to vapor at an optimum temperature within only a few minutes of initial engine start-up. The system continuously delivers a mixture of heated vaporized fuel and air to the intake manifold in the amount required for normal operation of an internal combustion engine. Additionally, the system permits the addition of steam to the mixture at accelerated engine speeds which further decreases fuel consumption and reduces carbon buildup in the engine. Because the fuel is in the vaporized condition, more complete combustion thereof occurs, and the pollutants in the engine exhaust gases are decreased to the extent that the engine can be operated without a catalytic converter in the exhaust system and emit exhaust gases well within the federal regulations for air pollution. Additionally, the improved fuel supply system of the invention provides a substantial increase in the miles driven per gallon of fuel when compared with the miles per gallon obtained with the engine operating on a normal carburetion system.

While a preferred embodiment of the invention has been described herein, it is to be understood that it may be embodied within the scope of the appended claims.

I claim:

1. A fuel supply system for an internal combustion engine having an intake manifold, an exhaust manifold and a carburetor in communication with said intake manifold, said system including heat exchange means in said exhaust manifold, an adapter plate mounted on said intake manifold and supporting said carburetor, means in said adapter plate providing flow communication between said carburetor and said intake manifold, a metering valve mounted on said adapter plate and connecting means in said adapter plate connecting said metering valve and said means providing flow communication between said carburetor and said intake manifold, a main liquid fuel line having an inlet end adapted to be connected to a fuel pump, a pressure regulator in said fuel line, a solenoid valve in said fuel line downstream of said pressure regulator, a vacuum responsive pressure regulator in said fuel line downstream of said solenoid valve and a vacuum controlled needle valve in said fuel line downstream of said vacuum responsive pressure regulator, said main fuel line being split into a primary line and a secondary line downstream of said vacuum controlled needle valve, a solenoid valve in said secondary line, said primary line and said secondary line extending to said heat exchange means to supply liquid fuel to said heat exchange means to vaporize the liquid fuel, a water line adapted to be connected to a pump, a pressure regulator in said water line, a solenoid valve in said water line downstream of said pressure regulator and a fixed orifice restrictor in said water line downstream of said solenoid valve, said water line extending between said fixed orifice restrictor and said heat exchange means to supply water to said heat exchange means, a vacuum controlled switch in communication with said intake manifold, means electrically connecting said vacuum controlled switch with said solenoid valves in said secondary line and said water line and means providing a pressure connection between said vacuum controlled switch and said vacuum responsive pressure regulator and said vacuum controlled needle valve wherein said solenoid valves are opened when said vacuum in said intake manifold increases as said engine accelerates to permit additional liquid fuel and water to flow to said heat exchange means to be converted to hot fuel vapor and steam, a fuel vapor line connecting said heat exchange means and said metering valve whereby hot fuel vapor and steam flows through said fuel vapor line to said metering valve and through said connecting means in said adapter plate to mix with air flowing from said carburetor to said means in said adapter plate providing flow communication between said carburetor and said intake manifold, whereby a heated fuel vapor, steam and air mixture is provided to said intake manifold for combustion in the internal combustion engine.

2. A fuel supply system as set forth in claim 1 wherein said connecting means in said adapter plate is at least one bore extending through said adapter plate between said carburetor and said intake manifold and a plurality of spaced spray nozzles in said adapter plate located at the periphery of said bore, whereby a mixture of hot fuel vapor and steam are sprayed from said nozzles into air passing through said bore.

3. A fuel supply system as set forth in claim 1 including an auxiliary liquid fuel line adapted to be connected to a fuel pump, a solenoid valve in said auxiliary fuel line and a delay relay electrically connected to said solenoid valve in said auxiliary fuel line whereby liquid fuel is initially provided to said carburetor through said auxiliary fuel line until said delay relay closes said solenoid valve in said auxiliary fuel line after a preset time to remove said auxiliary fuel line from the fuel supply system and opens said solenoid valve in said main fuel line to permit liquid fuel to flow to said heat exchange means for conversion to vapor.

4. A fuel supply system as set forth in claim 1 wherein said means electrically connecting said vacuum controlled switch with said solenoid valves in said secondary line and said water line includes a switching terminal to open said solenoid valve in said water line and said solenoid valve in said secondary line.

5. A fuel supply system as set forth in claim 1 including a check valve in each of said primary and secondary lines and said water line, said check valves being located upstream of said heat exchange means.

6. A fuel supply system as set forth in claim 1 wherein said means providing a pressure connection between said vacuum controlled switch and said vacuum responsive pressure regulator and said vacuum controlled needle valve includes a vacuum block having an inlet end connected to said vacuum controlled switch and an outlet end connected to said vacuum responsive pressure regulator and said vacuum controlled needle valve.

7. A fuel supply system as set forth in claim 1 including an electric water pump in said water supply line upstream of said pressure regulator.

8. A fuel supply system as set forth in claim 1 wherein said connecting means in said adapter plate is a pair of bores extending through said adapter plate between said carburetor and said intake manifold and a plurality of spaced spray nozzles in said adapter plate located at the periphery of each bore.

9. A fuel supply system as set forth in claim 1 wherein said vacuum controlled needle valve includes a hollow casing having a liquid fuel inlet member and a liquid fuel outlet member, a diaphragm in said casing dividing the interior of said casing into a vacuum chamber and a liquid fuel chamber, means connecting said vacuum chamber with said means providing a pressure connection with said vacuum controlled switch and means connecting said liquid fuel outlet member to said heat exchange means, resilient means in said vacuum chamber to position said diaphragm, means forming a fuel outlet orifice in said liquid fuel chamber providing a connection between said liquid fuel chamber and said liquid fuel outlet member and a taperd metering rod attached to said diaphragm and extending through said orifice, whereby the position of said metering rod relative to said orifice member is adjusted by movement of said diaphragm in response to the vacuum in said intake manifold to control the amount of fuel which can flow through said orifice to said heat exchange means.

10. A fuel supply system for an internal combustion engine having an intake manifold, an exhaust manifold and a carburetor in communication with said intake manifold, said system including heat exchange means in said exhaust manifold, an adapter plate mounted on said intake manifold and supporting said carburetor, connecting means in said adapter plate providing flow communication between said carburetor and said intake manifold, a metering valve mounted on said adapter plate and means in said adapter plate connecting said metering valve and said connecting means, a main liquid fuel line adapted to be connected to a fuel pump, a pressure regulator at the inlet end of said line, a solenoid valve in said line downstream of said pressure regulator, a vacuum responsive pressure regulator in said line downstream of said solenoid valve and a vacuum controlled needle valve in said line downstream of said vacuum responsive pressure regulator, said main fuel line being split into a primary line and a secondary line downstream from said vacuum controlled needle valve, a solenoid valve in said secondary line, said primary line and said secondary line being connected to said heat exchange means to supply liquid fuel to said heat exchange means to be vaporized, a water line adapted to be connected to a reservoir, a pressure regulator at the inlet end of said water line, a solenoid valve in said water line downstream of said pressure regulator and a fixed orifice restrictor in said water line downstream of said solenoid valve, a conduit between said fixed orifice member and said heat exchange means to supply water to said heat exchange means to be vaporized, means responsive to a vacuum in communication with said intake manifold and electrically connected to said solenoid valves in said secondary line and said water line and in pressure communication with said vacuum responsive pressure regulator and said vacuum controlled needle valve wherein said solenoid valves in said secondary line and said water line are opened when said vacuum in said intake manifold increases as said engine accelerates to permit additional liquid fuel and water to flow to said heat exchange means, a fuel vapor line connecting said heat exchange means and said metering valve whereby liquid fuel is converted to hot fuel vapor and water is converted to steam in said heat exchange means which flow through said fuel vapor line to said metering valve and through said connecting means in said adapter plate to mix with air flowing from said air cleaner through said carburetor to provide a hot fuel vapor, steam and air mixture to said intake manifold for combustion in the internal combustion engine.

* * * * *